United States Patent [19]

Moya et al.

[11] Patent Number: 5,271,839
[45] Date of Patent: Dec. 21, 1993

[54] PATTERNED POROUS POLYMERIC PRODUCT AND PROCESS

[75] Inventors: Wilson Moya, Derry, N.H.; Paul J. Cook, Manchester, Mass.

[73] Assignee: Millipore Corporation, Bedford, Mass.

[21] Appl. No.: 868,618

[22] Filed: Apr. 14, 1992

[51] Int. Cl.$^5$ .............................................. B01D 61/14
[52] U.S. Cl. .............................. 210/490; 210/500.29; 210/500.38; 210/500.41; 210/500.42
[58] Field of Search .............. 210/651, 652, 653, 654, 210/490, 500.29, 500.38, 500.41, 500.42; 264/41; 55/16, 158; 521/62; 427/507; 604/55

[56] References Cited

U.S. PATENT DOCUMENTS

| | | | |
|---|---|---|---|
| 3,846,404 | 11/1974 | Nichols | 264/41 X |
| 4,344,431 | 8/1982 | Yolles | 604/55 X |
| 4,764,320 | 8/1988 | Chau et al. | 55/16 X |
| 4,775,474 | 10/1988 | Chau et al. | 55/158 X |
| 5,094,876 | 3/1992 | Goldberg et al. | 427/507 X |
| 5,137,635 | 8/1992 | Seita et al. | 210/500.38 |

Primary Examiner—Frank Spear
Attorney, Agent, or Firm—Andrew T. Karnakis; Paul J. Cook

[57] ABSTRACT

Porous polymeric structures are formed from a polymeric sheet by sequential contact of the sheet with a solvent for the sheet and then a non-solvent for the sheet. All or a portion of each non-porous sheet surface is masked to prevent a portion of a surface of the sheet from contacting the solvent. The structure can be porous through all or a portion of its thickness.

56 Claims, 7 Drawing Sheets

PATTERNED POROUS POLYMERIC PRODUCT AND PROCESS

BACKGROUND OF THE INVENTION

This invention relates to a process for making porous polymeric products having a porous-nonporous pattern and to the porous polymeric products having a porous-nonporous pattern so-produced. More particularly, this invention relates to a process for making porous polymeric products having a porous-nonporous pattern from a homogeneous non-porous polymeric structure to produce a porous product having a porous-nonporous pattern that can include or be devoid of a solid nonporous layer.

Prior to the present invention, structures, such as membranes have been produced by thermal or solution phase inversion, stretching, sintering or track etching. By far, the most common process for making porous structures is solution phase inversion (wet and/or dry) by which many commercially available structures are made from polymers such as polyvinylidene fluoride (PVDF), cellulosics, polysulfones or polyamides (Nylons). Phase inversion structures are made by dissolving a polymer in an appropriate solvent to form a solution. The solution is cast into a thin film, usually 25 um to 250 um thick, on a substrate. The film then is exposed to a suitable non-solvent in the gaseous (dry) or liquid (wet) phase. This latter step induces phase separation, i.e., precipitation of the polymer as a solid mass from the solvent phase. Phase separation conditions can be controlled to effect formation of a porous polymeric structure having a relatively uniform pore size distribution.

It has been proposed in U.S. Pat. No. 2,783,984 to form a polyamide microporous structure by first forming a solution of polyamide in a mixture of a non-solvent and a solvent for polyamide at the point of incipient polyamide precipitation. An additive such as the non-solvent such as boric acid or citric acid is added to effect the desired precipitation and to form a self-sustaining non-transparent microporous structure. In the process, as the first step, a homogeneous polyamide solution is formed. The solution is cast on a flat surface such as glass and heated to effect solvent evaporation and to form the microporous structure. A similar process for forming polyamide microporous structures is disclosed in U.S. Pat. No. 3,408,315.

U.S. Pat. No. 3,876,738 discloses a process for forming polymeric microporous structures such as nylon structures. A dope solution of the polymer is first formed and is directly cast onto a surface which can be positioned below the surface of a non-solvent for the polymer. The dope solution is quenched within the nonsolvent to effect polymer precipitation and structure formation. Process control parameters are controlled to eliminate the prior art step of gelling in a high humidity atmosphere. The formation of a dope solution is required as the first step in the process.

U.S. Pat. No. 4,340,479 discloses a process for producing a skinless hydrophilic alcohol-insoluble polyamide structure. In a first step, a solution of the polyamide structure is formed and free of suspended particles. Nucleation of the solution is effected by the controlled addition to the solution of a non-solvent for the polyamide. The polyamide structure produced is characterized by reversion from a hydrophilic material to a hydrophobic material (which is not wetted by water) when heated to a temperature just below its softening point.

U.S. Pat. No. 4,203,847 and 4,203,848 also disclose processes for forming polymeric microporous structures. In this process, a solution of the polymer is first formed. The solution then is passed into a bath of nonsolvent for the polymer to effect polymer precipitation and structure formation. The ratio of solvent to non-solvent in the bath is monitored and its composition is adjusted to a desired range.

It has been proposed in U.S. Pat. No. 3,839,516 to contact a crystalline polymeric film with a swelling agent and then stretching the film while the swelling agent is removed to form a porous film. The pores are unidirectional in shape due to the tensile force exerted on the film during stretching. Similarly, it has been proposed in U.S. Pat. No. 3,426,754 to subject a crystalline polymeric film to cold drawing in an amount of 10% to 300% of its original length and then heat setting the film under tension to form a porous film. The pores formed in this film also are unidirectional in shape due to the tensile force exerted on the film during cold drawing and heat setting.

It has also been proposed to treat a film formed from a nonhomogeneous polymeric composition which contains either an extractable composition or a releasable composition such as by solvent extraction or heating so that pores are formed in the polymeric film after the composition has been either extracted and/or released. The polymeric compositions which can be treated in this manner are limited since they require the presence of either the extractable composition or the releasable composition.

Many of the processes described in the above-identified patents rely upon the formation of an initial casting solution which is then processed. The casting solutions are formed by admixing polymeric particles until the particles are completely dissolved. Since the particles vary in size, the time required to solvate the individual particles will vary from batch to batch.

The composition of these solutions must be controlled carefully in order to attain the desired polymer precipitation and structure formation in the subsequent step of contacting the solution with a non-solvent for the polymer. This procedure requires that the overall process be conducted as a batch process wherein the process is initiated by forming the polymer solution. In addition, it is difficult to precisely control the product consistency from batch to batch since it is difficult to exactly reproduce the solution composition from batch to batch.

Furthermore, none of the processes described in the above-identified patents or otherwise in the art is capable of producing a porous product having a patterned porous surface having porous domains and nonporous domains.

Therefore, it would be desirable to provide a process for forming polymeric porous products which is a continuous process rather than a batch process in order to improve efficiency. In addition, it would be desirable to provide such a process wherein the time that the solvent interacts with the solid polymer can be controlled precisely. The control would permit the formation of porous products having a more uniform surface porosity. In addition, it would be desirable to provide such a process wherein the average pore size can be controlled precisely and wherein the distance that the pores extend from the product surface into the product thickness can be controlled precisely.

SUMMARY OF THE INVENTION

The present invention provides a process for making porous polymeric products such as a microporous or ultrafiltration membranes or membrane-like products which can include a solid nonporous layer having a porous-nonporous pattern from a nonporous polymeric structure. The porous-nonporous pattern surface of the product comprises porous domains and nonporous domains. For convenience, this invention will be described specifically herein with reference to a solid non-porous film or sheet. However, it is to be understood that this invention is applicable for use with any solid non-porous polymeric composition capable of receiving a solvent in the form of a pattern regardless of its shape such as a film, fiber, sheet, slab, tube, cylinder, rod, or the like. The process of this invention permits the use of a continuous reel to reel process wherein the degree of polymer-solvent interaction can be controlled precisely by controlling the time the solvent contacts the non-porous structure such as a film or a sheet. This permits precise control of product porosity in terms of uniformity of surface porosity and of the average pore size within different layers of the product. In this process, the polymer sheet is treated by any means such as by masking so that a first portion of the surface is exposed to contact with a solvent to effect gelation of the exposed areas while a second portion of the surface is protected by the mask and is not gelled by solvent. The treated polymeric sheet is immersed in a solvent for the polymeric sheet so that a portion of one or both surfaces of the sheet is gelled directly with the solvent. The solvent softens the unmasked portion of the sheet by gelation. The gelled polymer sheet is removed from the solvent and directed to a step where the solvent is removed to effect polymer precipitation and pore formation. The solvent can be removed with a nonsolvent for the polymeric sheet which is miscible with the solvent, by evaporation of the solvent either in a dry atmosphere or a humid atmosphere or a combination of evaporation and nonsolvent contact. An alternative means for effecting polymer precipitation is to vary the temperature of the gelled polymeric composition thereby forming a porous structure and subsequently removing the solvent from the precipitated porous structure.

For convenience, this invention will be specifically herein with reference to the use of a nonsolvent bath th effect polymer precipitation. However it is to be understood that this invention can be conducted with any means for effecting polymer precipitation from a gelled polymeric composition such as by solvent evaporation or the like.

The surface can be treated such as by applying a mask to the sheet surface having a pattern which exposes only a portion of the sheet surface. Alternatively, the sheet surface can be treated only in selected areas to render the selected area resistant to gelation by the solvent such as by exposure to an electron beam or the like. In addition, solvent application means such as a spray means or a roller means can be utilized to apply solvent to the polymer sheet surface in selected areas. The time that the solvent gels the selected surface only of the polymeric sheet can be controlled easily since the time between which the sheet leaves the solvent bath and the time it enters the non-solvent bath can be controlled precisely by controlling the distance and/or travel velocity of the sheet between the two steps. The polymeric sheet can be supported or unsupported during travel between the two steps.

When the gelled polymer sheet is immersed in the non-solvent, the gelled portion of the sheet precipitates to form a porous structure. The degree of gelation can be controlled so that all or only a portion of the thickness of the polymer sheet is gelled. When only a portion of the sheet thickness is gelled, a portion of the product thickness remains non-porous and provides additional mechanical strength to the final partially porous product.

As used herein, the term "solvent" means a composition which effects gelation of a polymeric composition. It is to be recognized that some solvents have a strong gelation effect on some polymeric compositions and a relatively weak effect on other polymeric compositions. All that is necessary for purposes of this invention is that the solvent exerts some gelation effect. Similarly, the term "non-solvent" as used herein means a composition that effects precipitation of a gelled polymeric composition thereby to effect pore formation within the gelled polymeric composition. In addition, a non-solvent used herein does not gel a support substrate when such a substrate is utilized. Gel formation or gelation as used herein means a condition of a polymeric composition after contact with the solvent wherein a portion of the solvent is imbibed by the polymeric composition to cause the polymeric composition to become at least partially softened as compared to the solid form of the polymeric composition prior to contact with the solvent. As used herein the phrase "homogeneous polymeric composition" refers to a polymeric composition which is free of extractable compositions and/or releasable compositions which, when removed from the polymeric composition would effect formation of a porous structure in the polymeric composition. It is to be understood that in the process of this invention a small portion of the polymeric composition such as low molecular weight components may be extracted with the solvent. However, this extraction mechanism is insufficient to effect pore formation in the polymeric composition. In contrast, pore formation in the homogeneous polymeric compositions utilized in the present invention is effected by phase inversion wherein the gelled portion of the polymeric composition is converted to a porous solid composition. By the term "nondirectional" as used herein to describe a porous structure is meant a porous morphology which is random in any direction. Such a structure is in contrast to a unidirectional structure where the pores are aligned in a given direction such as is obtained with processes utilizing a stretching step where the pores are aligned in the direction of the tensile force encountered during the stretching step. In the process of this invention a solid nonporous polymeric structure is converted directly to a porous polymeric product in the absence of a step where the solid is converted to a liquid solution such as is utilized in a typical casting process. Since such a liquid solution is not required in the process of this invention, the porous product of this invention can be formed continuously from the nonporous solid polymeric starting material.

DESCRIPTION OF THE SPECIFIC EMBODIMENTS

In accordance with this invention, porous polymeric products having a porous-nonporous pattern are formed from a nonporous polymeric sheet. The nonporous sheet first is masked to expose a patterned surface of the polymeric sheet which can be selectively gelled with a solvent. The masking can be effected in any convenient manner such as with a mask layer temporarily or permanently adhered to the surface. Alternatively the surface can be selectively treated in a pattern to render the pattern more or less susceptible of being gelled with a solvent so that a contrast in surface areas is produced whereby a portion of the product surface can be gelled with the solvent and a second portion of the product surface is not gelled with the solvent. In an alternative embodiment of this invention the surface of the polymeric sheet need not be treated directly such as with a patterned mask or otherwise physically treated. The solvent can be applied in the form of a pattern to the surface of the sheet by any means such as with an applicator which deposits the solvent in a pattern. For example a roller applicator can have its surface formed in the desired pattern so that the solvent is applied only in the selected desired surface areas. Another method of applying the solvent in a pattern is to direct a stream or spray of the desired dimensions in the desired pattern along the surface of the polymeric sheet while metering the amount of solvent so that the desired pattern is retained on the sheet surface. When a mask is used, the masked nonporous sheet then is contacted with a solvent for the unmasked portions of the sheet so that a portion of one or both surfaces of the sheet come in direct contact with the solvent. The sheet having a nonporous portion and a semisolid or partially gelled portion then is removed from the solvent. The solvent is entrained with the sheet when it is removed from the source of the solvent such as a solvent bath or a solvent spray. The entrained solvent continues to gel a portion the sheet surface or surfaces such that a portion of the sheet is converted from a solid to a gel beginning at the sheet surface and progressing to the interior of the sheet thickness. During the time period of gelation, the mechanical strength of the sheet can be reduced to a condition wherein the sheet requires support, such as with a support belt which is not gelled by the solvent, in order to effect sheet transport to succeeding process steps.

In a second step, the partially gelled polymeric composition is contacted with a nonsolvent for the gelled polymeric composition. The nonsolvent is miscible with the solvent. This contact effects precipitation of the gelled polymeric composition and the formation of pores within the precipitated polymeric composition. The portion of the polymeric composition which was not gelled remains as a nonporous solid throughout the process and after completion of the process.

In a third step, the porous polymeric sheet having a porous-nonporous pattern then is contacted with a rinse bath to remove substantially all of the solvent and non-solvent. The rinse bath is miscible with both the solvent and non-solvent and does not attack the porous polymeric product having a porous-nonporous pattern. The rinsed polymeric product then is dried by any conventional means such as by heating.

The products formed in accordance with the present invention can comprise a patterned porous structure wherein the pores extend through the entire thickness of the product in selected areas of the sheet. Alternatively, the product of this invention can comprise a composite product having a layer which is a nonporous polymeric solid and one or both outside surface layers comprising a patterned porous polymeric structure. The porous portion of the products of this invention are characterized by having tortuous, random, nondirectional pathways throughout the porous structure. The pathways can be open wherein they are in communication with each other or closed. As used herein the term "closed pathways" means closed cells which are not in communication with each other. This porous structure differs from track-etched porous products which have straight non-random paths. The completely porous structure which is porous in selected areas of the surface can be utilized as filtration media while the composite structure having an interior nonporous layer can be utilized in blotting process such as nucleic acid blotting, diagnostic applications or chromatographic separations such as thin layer chromatography.

The products of this invention can be made from polymeric sheets or film having a wide variety of thicknesses thus making the final product as strong or rigid as desired.

When utilizing a mask, the polymeric sheet is masked in a first step. The masked sheet then is contacted with a solvent for the polymeric composition in any convenient manner such as by passing the sheet through a solvent bath or spraying the solvent onto the sheet. When it is desired to contact only one surface of the sheet with solvent, the second surface is protected with a protecting sheet which is temporarily or permanently laminated or adhered to the second surface. The protecting sheet is not soluble in the solvent. The protecting sheet can be applied to one or both surfaces in a pattern by utilizing a mask so that only the exposed portion of the polymeric sheet is contacted with the solvent. The porous structure(s) is produced only in the pattern of the exposed polymeric sheet surface. This invention is particularly useful when for example, it is desired to provide separated filtration areas on an integral sheet wherein it is desired to prevent cross talk between the filtration areas so that samples do not become contaminated with each other. One such use is with a standard 96 well apparatus wherein a plurality of samples are processed through a porous filtration structure from a sample introduction well, through the structure and into a sample collection well. Other uses for such a patterned sheet include diagnostics, fluidics, or the like. In any event, the degree of interaction of the polymeric sheet with the solvent including the amount, type of solvent, solvent and/or sheet temperature and the time of contact of the sheet with the solvent is such as to effect the desired degree of gelation of the polymeric sheet in selected areas so that the solvent penetrates into the desired thickness of the sheet to form a gelled polymeric composition which is sufficiently mechanically strong, either supported or unsupported to retain its original sheet configuration yet, when subsequently contacted with a nonsolvent for the polymeric composition, the gelled polymeric composition precipitates to form a porous structure through all or a portion of its thickness beginning with the sheet surface.

In a preferred embodiment of this invention, the process is conducted as a reel-to-reel process. The nonporous film is stored on a feed roller and passed continuously into contact with the solvent, nonsolvent, washed and dried on a series of rollers and/or belts wherein the time of contact with solvent and nonsolvent is controlled to effect the desired degree of gelation and subsequent porous structure formation wherein the pores are of a relatively uniform size.

Representative suitable homogeneous polymeric films or sheets which can be utilized in the invention include polyamides, polycarbonates, polyvinylchloride, polyvinylidene difluoride, polyolefins such as polyethylene or polypropylene, cellulose esters such as cellulose acetate or cellulose nitrate, polystyrene, polyimides, polyetherimides, polysulfones, polyethersulfones, acrylic polymers, methacrylic polymers, copolymers thereof, blends thereof or the like. The polymeric composition can be crystalline, noncrystalline or partially crystalline. The only requirement for the polymeric composition is that there be an available solvent for the polymeric composition and a nonsolvent, when used, is miscible with the solvent for the polymeric composition so that the polymeric composition can be sequentially gelled and precipitated. The porous portion of the product of this invention can have pores which are micropores having a size typically between about 0.05 to 10 microns or ultrafiltration pores having a size typically between about 40 Angstroms and 0.05 microns. The surface morphology of the surface of this invention can be nonskinned having an open, lacy or nodular structure or can be skinned.

When it is desired to produce a laminated product in a reel to reel process, a first masked polymeric sheet is passed sequentially through a solvent for the polymeric composition of the first polymeric sheet, in contact with a first surface of a substrate sheet, a first fusion step to adhere the first polymeric sheet to the substrate sheet and then through a nonsolvent for the first polymeric sheet and the substrate sheet. A second masked polymeric sheet, when utilized, is passed sequentially through a solvent for the polymeric composition of the second polymeric sheet, a second fusion step to adhere the second polymeric sheet to the substrate sheet and then through a nonsolvent for the second polymeric sheet and the substrate sheet. In a preferred embodiment, the first fusion step and the second fusion step are the same step. Also, in a preferred embodiment, the nonsolvent bath is the same bath for the first polymeric sheet and the second polymeric sheet. If desired the laminated product can be formed without a substrate sheet wherein the first polymeric sheet having a gelled pattern is contacted directly to the second polymeric sheet having a gelled pattern. The laminates so produced are contacted with a non-solvent to effect pore formation as described above.

The process will be described herein further with particular reference to processing a polyamide film or sheet. However, it is to be understood that this description is exemplary and applicable to processing other polymeric compositions with the use of appropriate solvents and nonsolvents and appropriate process conditions to effect the desired gelation and precipitation. In a first step, one or both surfaces of a polyamide 66 sheet are masked with a patterned sheet which is not attacked by a solvent for the polyamide such as formic acid. A suitable masking sheet can be comprised of polypropylene which is intimately contacted with the polyamide sheet surface. When utilizing a polyamide (Nylon 66) film of about 3 mils thick to prepare a porous patterned membrane having pores throughout its thickness, the masked sheet is contacted with formic acid to coat the exposed sheet surface. Gelation of the exposed surface of the polyamide film having a 3 mil thickness with formic acid is effected generally for a period of time of between about 5 and 30 seconds in order to effect gelation throughout the film thickness in the desired pattern. Lesser time periods of solvation are utilized when it is desired to produce porous structures less than the total thickness of the original polymeric sheet. In addition greater or lesser times are utilized depending upon the thickness of the starting sheet. The gelled sheet then is contacted with a non-solvent for the polymeric composition for a short time sufficient to effect precipitation of the gelled polymeric composition as a porous product. Typically, the non solvent can be humid air, water, water/formic acid, alcohol or water-alcohol mixtures at a temperature between about 0° C. and 50° C. Contact with the nonsolvent typically is between about 1 and 10 minutes in order to effect precipitation of the gelled polymeric composition to produce the porous product. The product then is rinsed in water, alcohol or the like at a temperature between about 0° C. and 50° C. to remove the solvent and nonsolvent.

Figure 1:
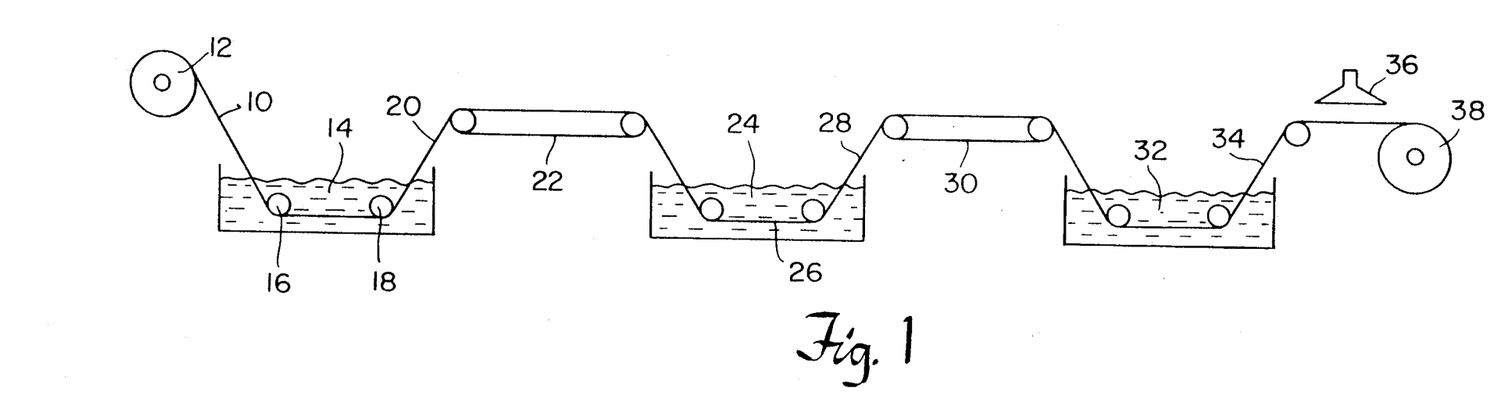
FIG. 1 illustrates the process of this invention

Referring to FIG. 1, a reel-to-reel process for conducting this invention is illustrated. The masked nonporous polymeric sheet 10 is stored on motorized roller 12. The sheet 10 is passed into solvent bath 14 under rollers 16 and 18 to gel the unmasked portion of the sheet 10. The partially gelled sheet 20 is passed onto motorized belt 22 which supports and moves the gelled sheet to nonsolvent bath 24. The gelled portion of the sheet 26 in bath 24 is precipitated to form a porous structure 28. The product 28 is passed onto motorized belt 30 and directed into rinse bath 32. The rinsed product 34 is dried such as with a heating lamp 36 and stored on take-up roll 38. In the case of a polyamide nonporous sheet, the solvent bath 14 can comprise formic acid, trifluoroethanol, phenol, mixtures thereof, mixtures with non-solvents or the like. The non-solvent bath 24 and rinse bath 32 can comprise water, alcohol or the like. The nonsolvent bath 24 and rinse bath 32 can be replenished periodically or continuously to remove the accumulated solvent therein and replacing it with the nonsolvent or rinse solution.

Figure 2:
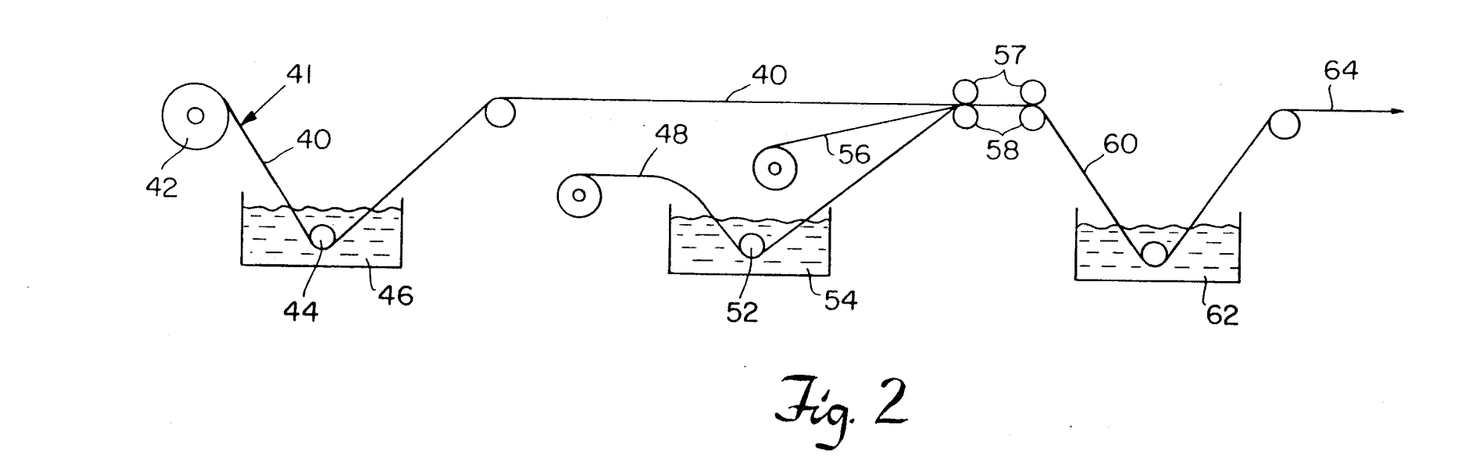
FIG. 2 illustrates an alternative process of this invention wherein a laminate is formed.

Referring to FIG. 2, a process is depicted for forming a laminate product of this invention. A masked first polymeric sheet 40 such as a polyamide 66 is passed from reel 42 under roller 44 and through a solvent bath 46 such as 98% formic acid to gel the unmasked portions of the polymeric sheet 40. The top surface 41 of sheet 40 is masked so that only selected areas of the surface 41 contact the solvent 46. A masked second polymeric sheet such as polyamide 6 (48) is passed from reel 50, under roller 52 through solvent bath 54 such as 88% formic acid to gel the unmasked portion of the polymeric sheet 48. The bottom surface 43 is masked so that only selected areas of the surface 43 contact the solvent 54. The gelled sheets 40 and 48 are contacted with substrate 56 to form a singular laminated sheet 60. The laminated sheet 60 is passed through bath 62 such as water which is a nonsolvent for both polymeric sheets 40 and 42 as well as substrate sheet 56. Contact with the nonsolvent 62 effects precipitation of the gelled portions of sheets 40 and 48 thereby to form a selectively porous structure for both sheets 40 and 48 in the laminated final product 64.

Figure 9:
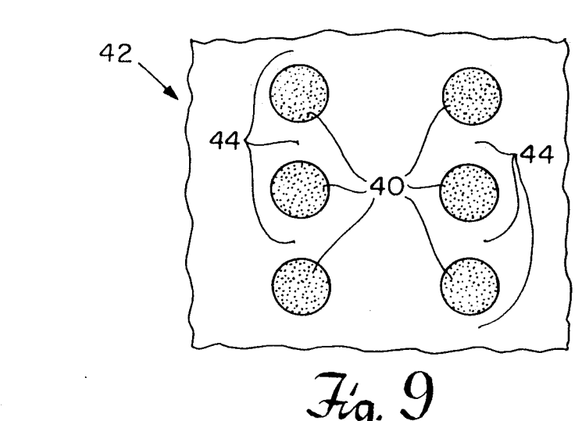
FIG. 9 is a partial top view of a 96 well filter of this invention.

Referring to FIG. 9, when using an appropriate mask on both surfaces of the nonporous sheet 42 during contact with solvent as described above, separate porous domains 40 can be formed which extend through the thickness of the sheet 42. The porous domains 40 are surrounded by nonporous domains 44 which prevent migration of liquid between porous domains 40. Thus, the sheet 42 can be used when it is desired to prevent cross-talk between filtration areas defined by the porous domains 40.

Figure 10:
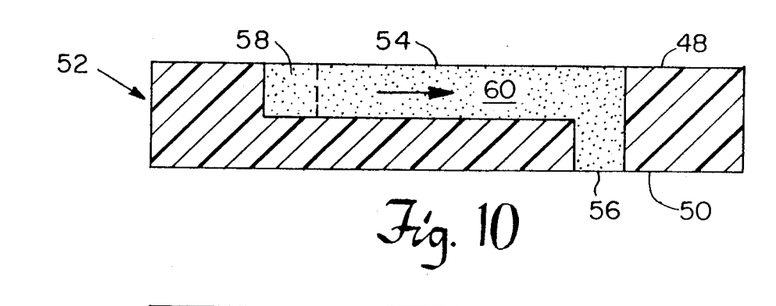
FIG. 10 is a cross sectional view of a product made in accordance with this invention.
Figure 11:
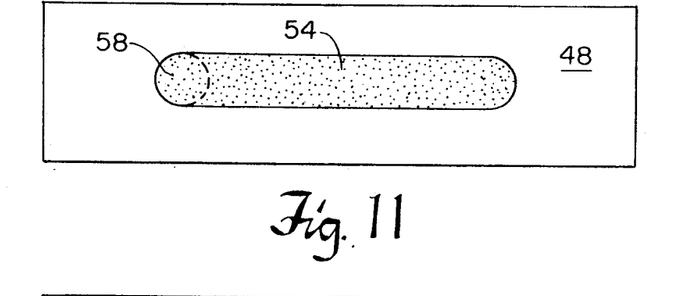
FIG. 11 is a top view of the product of FIG. 10.
Figure 12:
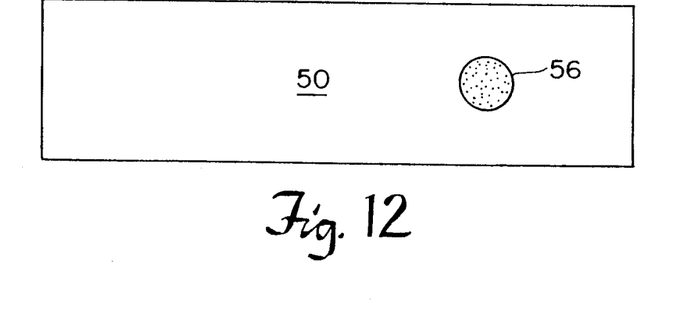
FIG. 12 is a bottom view of the product of FIG. 10.

Referring to FIGS. 10, 11 and 12, when utilizing a mask on surfaces 48 and 50 of sheet 52 during contact of the sheet 52 with solvent as described above, porous domains 54 and 56 of any desired shape can be formed. The porous domains 54 and 56 can be used in conjunction with each other to lengthen a porous path without increasing the thickness of the sheet 52. A liquid to be filtered can be applied to area 58, caused to travel along path 60 and be removed from the sheet 52 through porous domain 56. In addition, porous domains 54 can be utilized to effect chromatographic separations of a liquid sample initially applied to area 58 to effect separation of sample constituents in one or more strata along the length of porous domain 54.

Figure 13:
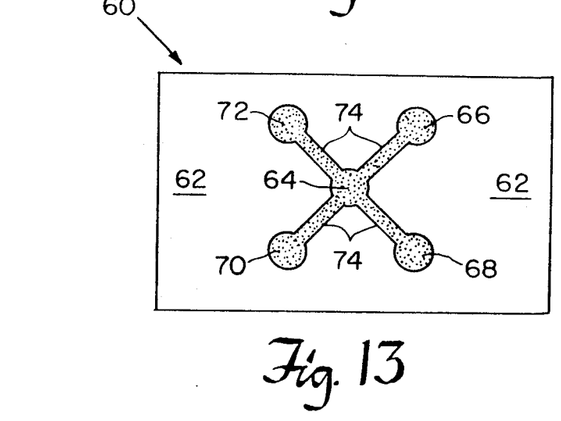
FIG. 13 is a top view of a patterned surface suitable for effecting multiple separate reactions of a sample.

Referring to FIG. 13 a sheet 60 is provided having a porous domain 64, 66, 68, 70, 72 and 74 and a nonporous domain 62 which is produced by the process of this invention by using an appropriately shaped mask as described above. The porous domain includes a central well 64 and a plurality of satellite wells 66, 68, 70 and 72 along porous paths 74. Porous pathways 74 are provided between central well 64 and satellite wells 66, 68, 70 and 72. In use, a sample is introduced into well 64 which migrates by capillary action into wells 66, 68, 70 and 72. Different reagents are introduced into wells 66, 68, 70 and 72 so that the sample is reacted with different reagents simultaneously. The reagents are prevented from migrating to satellite wells other than the satellite well into which it is introduced by applying a controlled volume of the reagent. This arrangement is particularly suitable for diagnostics applications.

Figure 14:
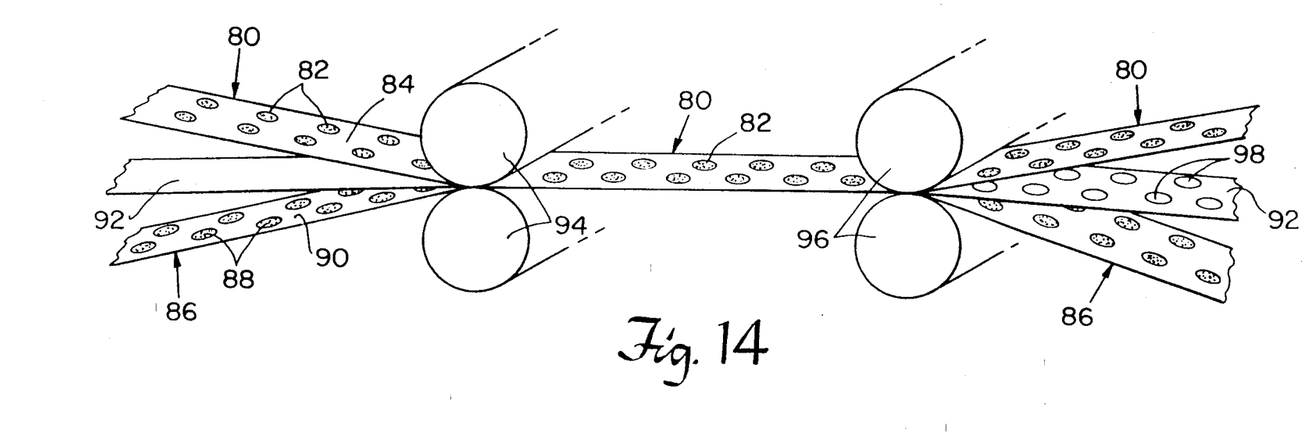
FIG. 14 illustrates an alternative procedure for masking in accordance with the invention.

Referring to FIG. 14, masking and solvent delivery are effected in one step as shown. Polymeric sheet 80 includes porous domains 82 and nonporous domains 84. Sheet 86 includes porous domains 88 and nonporous domains 90. Sheet 92 initially is a nonporous polymeric sheet. A solvent for sheet 92 but which is a non-solvent for sheets 80 and 86 is deposited in porous domains 82 and 88. The sheets 80, 86 and 92 are compressed between rollers 94 and 96 in order to effect intimate contact of sheet 92 with sheets 80 and 86 and to effect transfer of solvent from sheets 80 and 86 to sheet 92. After being passed between rollers 96, sheet 92 is separated from contact with sheets 80 and 86. Sheet 82 has domains of solvent 98 deposited thereon and is then directed to contact with a nonsolvent as described above to form porous domain on sheet 92 in the domains 98.

Figure 15:
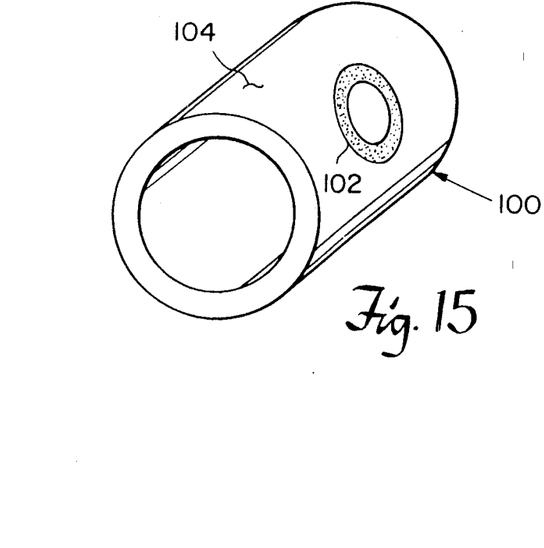
FIG. 15 illustrates a roller means suitable for effecting this invention.

Referring to FIG. 15 a roller 100 formed, for example from a ceramic composition, a metal composition or a polymeric composition includes a zone 102 which preferentially imbibes a solvent while a surrounding area 104 rejects and is free of solvent. Solvent is applied to a polymeric structure only from area 102 of roller 100.

Figure 16:
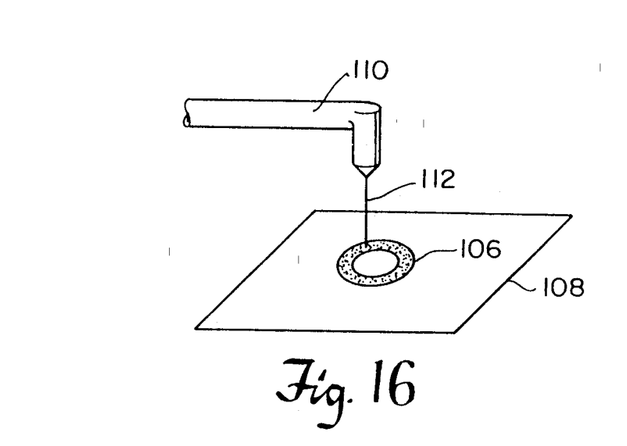
FIG. 16 illustrates a nozzle means suitable for effecting this invention.
Figure 17:
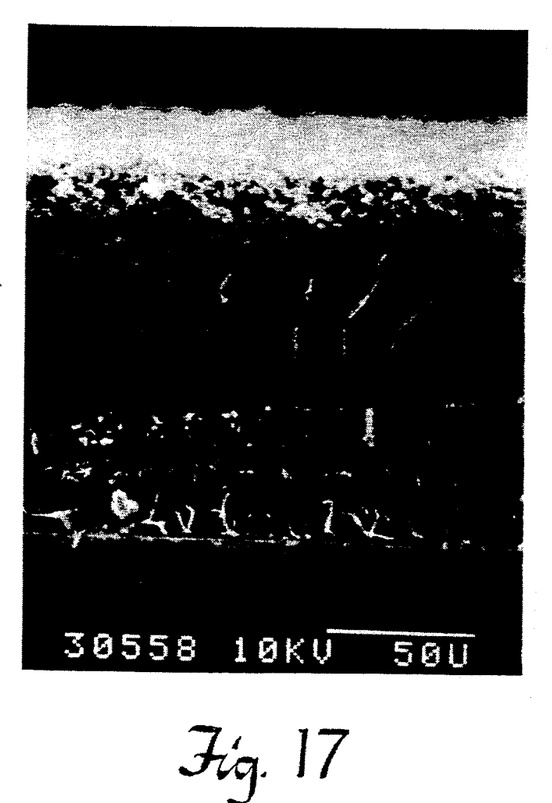
FIG. 17 is a photomicrograph at 500 times magnification of the cross section of the product of example III.

Referring to FIG. 16 a solvent 106 is applied in a pattern to polymeric structure 108 from a nozzle 110 which is moved relative to the structure 108 by moving either the structure 108 or the nozzle 110. The volume of solvent 112 exiting the nozzle 110 is controlled in order to retain the solvent in the pattern 106 on the polymeric structure 108.

When only one surface of the non-porous sheet is contacted with a solvent, one surface of the resulting porous structure contains pores and the second surface can contain or be free of pores. When forming a product which is not completely porous, a portion of the product thickness remains as a nonporous solid and the largest pores are located on the structure surface or surfaces initially contacted with solvent.

The following examples illustrate the present invention and are not intended to limit the same.

EXAMPLE I

This example illustrates the formation of a patterned porous polyamide product having two porous patterned surfaces and a layer within the interior of its thickness which non-porous.

Figure 3:
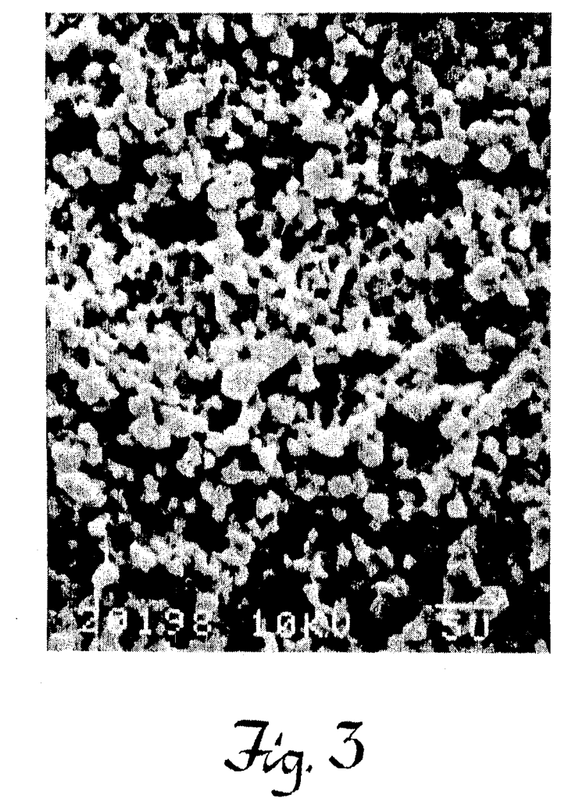
FIG. 3 is a photomicrograph at 2000 times magnification of one surface of a polyamide porous product having a non-porous layer of this invention.
Figure 4:
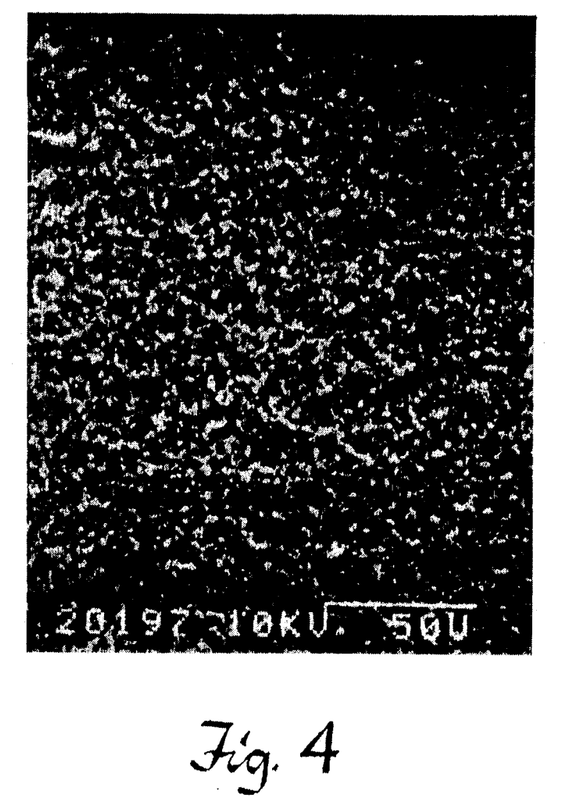
FIG. 4 is a photomicrograph at 500 times magnification of a second surface of the product of FIG. 3.
Figure 5:
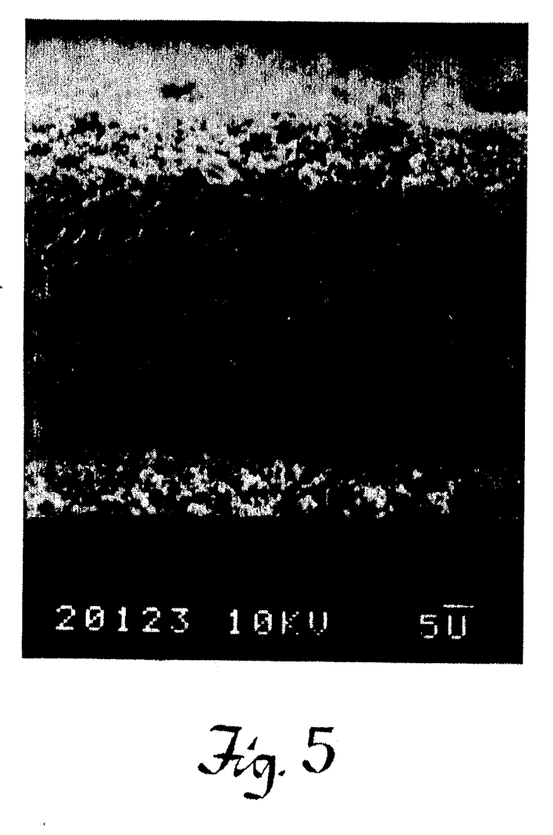
FIG. 5 is a photomicrograph at 1000 times magnification of the cross section of the product of FIGS. 3 and 4.

A 4 mil thick sheet of Nylon 66 polyamide was masked on both sides to form an exposed pattern in the shape of a circle of about 4 millimeters in diameter on each side of the sheet. The circle patterns on both sides of the film were located in the same position relative to one another. The masking sheets were masking tape which were adhered to the polyamide sheet surfaces by the adhesive side. The masked polyamide sheet then was immersed in a formic acid solvent at 25° C. for 20 seconds to gel the exposed areas. The film containing the exposed gelled polymeric patterned composition on both sides then was immersed in propanol nonsolvent at 25° C. for 5 minutes whereupon the gelled portions of the film precipitated to form discrete porous areas. The porous product then was rinsed in water and dried at 30° C. The masking sheets then were removed to reveal the porous pattern in an otherwise non-porous film. Opposing exposed surfaces of the microporous structure are shown in FIGS. 3 and 4. The cross section of the porous structure is shown in FIG. 5. As shown in FIG. 5, the surface of FIG. 3, 40 and the surface of FIG. 4, 42 contain pores having the largest pore size in the overall structure. The interior of the structure 44 has the smallest pores.

EXAMPLE II

This example illustrates the formation of a patterned porous polyamide product having two patterned porous surfaces and which is porous throughout its thickness.

Figure 6:
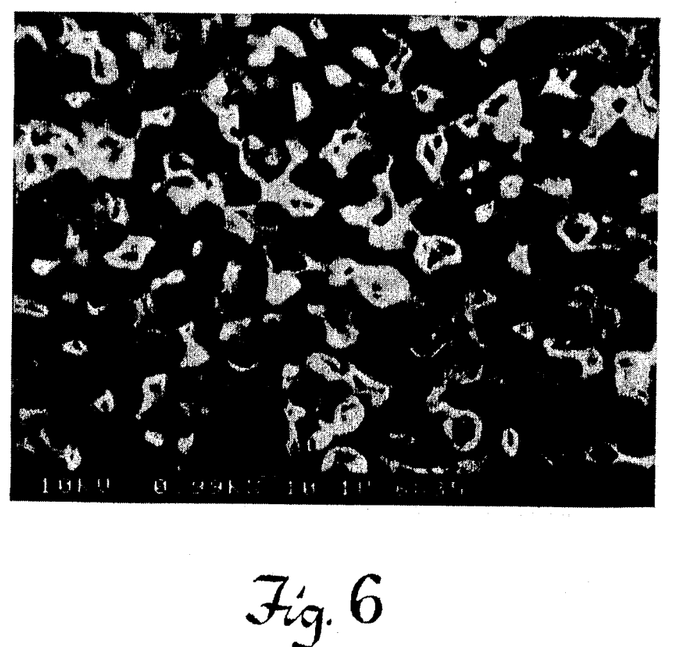
FIG. 6 is a photomicrograph at 990 times magnification of one surface of a polyamide membrane which is microporous throughout its thickness.
Figure 7:
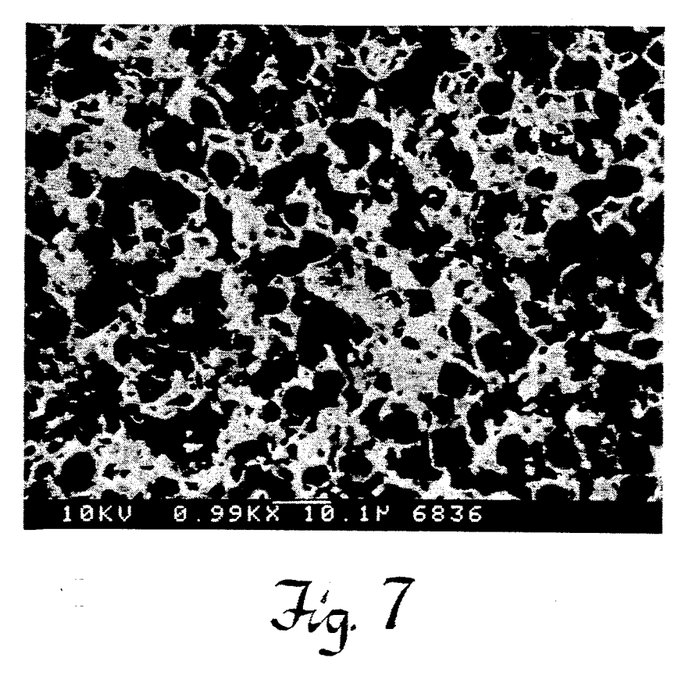
FIG. 7 is a photomicrograph at 990 times magnification of the opposing surface of the membrane surface of FIG. 6.
Figure 8:
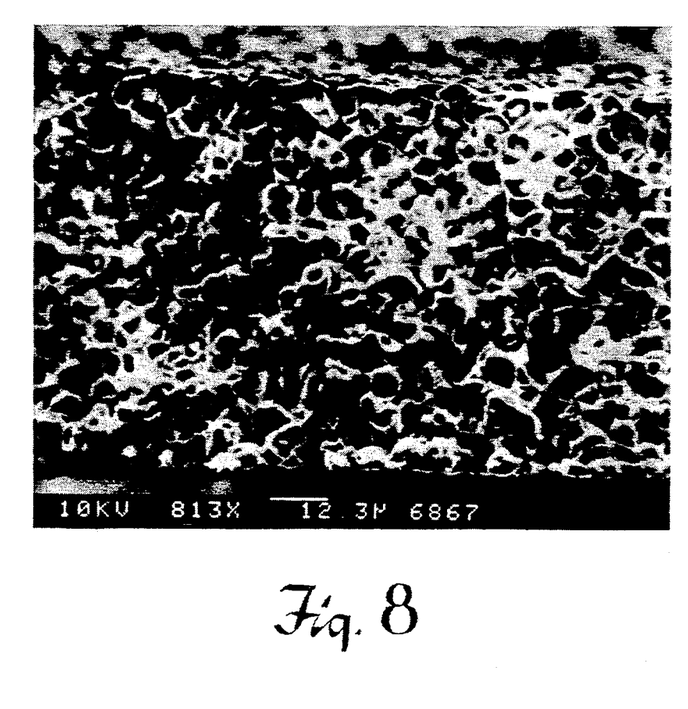
FIG. 8 is a photomicrograph at 813 times magnification of the cross section of the membrane of FIG. 6.

A 3 mil thick sheet of Nylon 6/66 polyamide copolymer was masked on both surfaces to form an exposed pattern in the shape of a circle of about 4 millimeters in diameter on each side. The circle patterns on both sides o the film were located in the same position relative to one another. The masking sheets were masking tape which were adhered to the polyamide sheet surfaces by the adhesive side. The masked polyamide film then was immersed in a formic acid solvent at 25° C. for 5 to 10 seconds to gel the exposed areas. The sheet then was removed from the solvent, placed on a glass support and allowed to gel for 5 minutes at 25° C. The exposed surfaces of the film formed a gel in the shape of the above pattern. The gelled portion of the film then was immersed in isopropanol-water nonsolvent at 25° C. for 5 minutes whereupon the gelled portion of the film precipitated to form a porous structure in the shape of the pattern described above. The porous product then was rinsed in water and dried at 30° C. The masking sheets then were removed to reveal the porous pattern in an otherwise non-porous film. Opposing exposed surfaces of the microporous structure are shown in FIGS. 6 and 7. The cross section of the porous structure is shown in FIG. 8.

EXAMPLE III

This example illustrates the formation of a patterned porous polyamide product having one porous patterned surface and a non-porous opposing surface.

A 4 mil thick sheet of Nylon 66 polyamide was masked on one side to form an exposed pattern in the shape of a circle of about 4 millimeters in diameter, the other side of the sheet was masked completely leaving no exposed areas. The masking sheets were masking tape which were adhered to the polyamide surface by the adhesive side. The masked polyamide sheet then was immersed in a formic acid solvent at 25° C. for 20 seconds to gel the exposed areas. The film containing the exposed gelled polymeric patterned composition on one side then was immersed in propanol nonsolvent at 25° C. for 5 minutes whereupon the gelled portions of the film precipitated to form a discrete porous area. The porous product then was rinsed in water and dried at 30° C. The masking sheets then were removed to reveal the porous pattern in an otherwise non-porous film surface on one side and a second non-porous surface.

EXAMPLE IV

This example illustrates the formation of a patterned porous polyetherimide product having two patterned porous surfaces and a layer within the interior of its thickness which is non-porous.

A 2 mil thick sheet of polyetherimide was masked on both sides to form an exposed pattern in the shape of a line 1 millimeter wide by 5 millimeters long on each side of the sheet. The line patterns on each side of the sheet were positioned perpendicular to each other to form a cross. The masking sheets were masking tape which were adhered to the polyetherimide sheet surfaces by the adhesive side. The masked polyetherimide sheet then was immersed in N-methyl pyrrolidone at 90°–100° C. for 3–5 seconds to gel the exposed areas. The film containing the exposed gelled polymeric patterned composition then was removed from the solvent and immersed in a solution containing 20% methanol/80% N-methyl pyrrolidone for 1–2 minutes at 25° C. and subsequently immersed in a non-solvent bath consisting of 50% methanol/50% N-methyl pyrrolidone for 2–5 minutes at 25° C. whereupon the gelled portions of the film precipitated to form discrete porous areas. The porous product was then rinsed in methanol and then in water and dried at 30° C. The masking sheets then were removed to reveal the porous patterns in an otherwise non-porous film.

EXAMPLE V

This example illustrates the formation of a patterned porous polystyrene product having two patterned porous surfaces and a layer within the interior of its thickness which is non-porous.

A 2 mil thick sheet of polystyrene was masked on both sides to form an exposed pattern in the shape of a line 1 millimeter wide by 5 millimeters long on each side of the sheet. The line patterns on each side of the sheet were positioned perpendicular to each other to form a cross. The masking sheets were masking tape which were adhered to the polystyrene sheet surfaces by the adhesive side. The masked polystyrene sheet then was immersed in n-butyl acetate at 25° C. for 3–5 seconds to gel the exposed areas. The film containing the exposed gelled polymeric patterned composition then was removed from the solvent and immersed in a solution containing 20% methanol/80% n-butyl acetate for 1–2 minutes at 25° C. and subsequently immersed in a non-solvent bath consisting of 50% methanol/50% n-butyl acetate for 2–5 minutes at 25° C. whereupon the gelled portions of the film precipitated to form discrete porous areas. The porous product was then rinsed in methanol and then in water and dried at 30° C. The masking sheets then were removed to reveal the porous patterns in an otherwise non-porous film.

EXAMPLE VI

This example illustrates the formation of a patterned porous polysulfone product having two patterned porous surfaces and a layer within the interior of its thickness which is non-porous.

A 2 mil thick sheet of polysulfone was masked on both sides to form an exposed pattern in the shape of a line 1 millimeter wide by 5 millimeters long on each side of the sheet. The line patterns on each side of the sheet were positioned perpendicular to each other to form a cross. The masking sheets were masking tape which were adhered to the polysulfone sheet surfaces by the adhesive side. The masked polysulfone sheet then was immersed in N-methyl pyrrolidone at 90°–100° C. for 3–5 seconds to gel the exposed areas. The film containing the exposed gelled polymeric patterned composition then was removed from the solvent and immersed in a solution containing 30% methanol/70% N-methyl pyrrolidone for 1–2 minutes at 25° C. and subsequently immersed in a non-solvent bath consisting of 100% methanol for 2–5 minutes at 25° C. whereupon the gelled portions of the film precipitated to form discrete porous areas. The porous product was then rinsed in methanol and then in water and dried at 30° C. The masking sheets then were removed to reveal the porous patterns in an otherwise non-porous film.

We claim:

1. A polymeric structure having a thickness which comprises a polymeric composition having a patterned porous surface portion with pores comprising non-directional tortuous pathways extending throughout the thickness of said structure said pathways formed by precipitation of said polymeric composition, the remaining portion of said structure comprising a homogeneous nonporous polymeric composition.

2. A polymeric structure having a thickness which comprises a polymeric composition having a patterned porous surface portion with pores comprising non-directional cortuous pathways extending through a portion of the thickness of said structure, said pathways formed by precipitation of said polymeric composition, the remaining portion of said structure comprising a homogeneous nonporous polymeric composition.

3. A polymeric structure having a thickness which comprises a polymeric composition having a patterned porous surface with pores comprising non-directional tortuous pathways, said pathways formed by precipitation of said polymeric composition, a first portion of said pores extending throughout the thickness of said structure and a second portion of said pores extending through a portion of the thickness of said structure, the remaining portion of said structure comprising a homogeneous nonporous polymeric composition.

4. The polymeric structure of claim 1 wherein said pores comprise a microporous structure.

5. The polymeric structure of claim 2 wherein said pores comprise a microporous structure.

6. The polymeric structure of claim 3 wherein said pores comprise a microporous structure.

7. The polymeric structure of claim 1 wherein said pores comprise an ultrafiltration structure.

8. The polymeric structure of claim 2 wherein said pores comprise an ultrafiltration structure.

9. The polymeric structure of claim 3 wherein said pores comprise an ultrafiltration structure.

10. The polymeric structure of any one of claims 1, 2, 3, 4, 5, 6, 7, 8 or 9 wherein said structure is formed of a polyamide composition.

11. The polymeric structure of any one of claims 1, 2, 3, 4, 5, 6, 7, 8 or 9 wherein said structure is formed of a nitrocellulose composition.

12. The polymeric structure of any one of claims 1, 2, 3, 4, 5, 6, 7, 8 or 9 wherein said structure is formed of polyvinylidene difluoride.

13. The polymeric structure of any one of claims 1, 2, 3, 4, 5, 6, 7, 8 or 9 wherein said structure is formed of a poly(vinyl chloride) composition.

14. The polymeric structure of any one of claims 1, 2, 3, 4, 5, 6, 7, 8 or 9 wherein said structure is formed of a polystyrene composition.

15. The polymeric structure of any one of claims 1, 2, 3, 4, 5, 6, 7, 8 or 9 wherein said structure is formed of a polysulfone composition.

16. The polymeric structure of any one of claims 1, 2, 3, 4, 5, 6, 7, 8 or 9 wherein said structure is formed of a polyethersulfone composition.

17. The polymeric structure of any one of claims 1, 2, 3, 4, 5, 6, 7, 8 or 9 wherein said structure is formed of a cellulose acetate composition.

18. The process for forming a porous polymeric structure having a patterned porous surface portion from a nonporous polymeric structure which comprises contacting said nonporous structure with a solvent for said nonporous structure while a portion of at least one surface of said nonporous structure is selectively masked to prevent gelation with said solvent thereby to effect gelation of an unmasked portion of said nonporous structure surface to form a gelled portion and contacting a resultant partially gelled structure with a non-solvent for said gelled portion to effect precipitation of the gelled portion of said structure to form a patterned porous structure having non-directional tortuous pathways.

19. The process of claim 18 wherein two surfaces of said nonporous structure are selectively masked during contact of said nonporous structure with said solvent.

20. The process of any one of claims 18 or 19 wherein said nonporous structure is gelled through a portion of its thickness.

21. The process of any one of claims 18 or 19 wherein said nonporous structure is gelled throughout its entire thickness.

22. The process of any one of claims 18 or 19 wherein said structure is formed of a polyamide composition.

23. The process of any one of claims 18, or 19 wherein said structure is formed of a nitrocellulose composition.

24. The process of any one of claims 18, or 19 wherein said structure is formed of a polycarbonate composition.

25. The process of any one of claims 18, or 19 wherein said structure is formed of a poly(vinyl chloride) composition.

26. The process of any one of claims 18, or 19 wherein said structure is formed of a polyvinylidene fluoride composition.

27. The process of any one of claims 18 or 19 wherein said structure is formed of a polysulfone composition.

28. The process of any one of claims 18 or 19 wherein said structure is formed of a polyethersulfone composition.

29. The process of any one of claims 18, or 19 wherein said structure is formed of a cellulose acetate composition.

30. The process for forming a porous structure having a patterned porous surface portion from a nonporous polymeric structure which comprises applying to said nonporous structure a solvent for said nonporous structure in the form of a pattern thereby to effect gelation of a contacted portion of said nonporous structure surface to form a gelled portion while preventing gelation of an uncontacted portion of said nonporous structure surface and contacting said gelled portion with a non-solvent for said gelled portion to effect precipitation of the gelled portion of said structure thereby to form a patterned porous structure having nondirectional tortuous pathways.

31. The process of claim 30 wherein said solvent is applied in a pattern to two surfaces of said nonporous structure.

32. The process of any one of claims 30 or 31 wherein said nonporous structure is gelled through a portion of its thickness.

33. The process of any one of claims 30 or 31 wherein said nonporous structure is gelled through its entire thickness.

34. The process of any one of claims 30 or 31 wherein said structure is formed of a polyamide composition.

35. The process of any one of claims 30, or 31 wherein said structure is formed of a nitrocellulose composition.

36. The process of any one of claims 30, or 31 wherein said structure is formed of a polycarbonate composition.

37. The process of any one of claims 30, or 31 wherein said structure is formed of a poly(vinyl chloride) composition.

38. The process of any one of claims 30, or 31 wherein said structure is formed of a polyvinylidene fluoride composition.

39. The process of any one of claims 30 or 31 wherein said structure is formed of a polysulfone composition.

40. The process of any one of claims 30 or 31 wherein said structure is formed of a polyethersulfone composition.

41. The process of any one of claims 30, or 31 wherein said structure is formed of a cellulose acetate composition.

42. The process of any one of claims 30, or 31 wherein said structure is formed from a polystyrene composition.

43. The process of anyone of claims 18 or 19 wherein said structure is formed from a polystyrene composition.

44. The polymeric structure of any one of claims 1, 2, 3, 4, 5, 6, 7, 8 or 9 which is in the form of a patterned membrane.

45. The polymeric structure of any one of claims 1, 2, 3, 4, 5, 6, 7, 8 or 9 which is in the form of a slab.

46. The polymeric structure of any one of claims 1, 2, 3, 4, 5, 6, 7, 8 or 9 wherein such structure is formed of a polyolefin composition.

47. The polymeric structure of any one of claims 1, 2, 3, 4, 5, 6, 7, 8 or 9 wherein such structure is formed of a polyacrylic composition.

48. The polymeric structure of any one of claims 1, 2, 3, 4, 5, 6, 7, 8 or 9 wherein such structure is formed of a polymethacrylic composition.

49. The process for forming a porous polymeric structure having a patterned porous surface portion from a nonporous polymeric structure which comprises contacting said nonporous structure with a solvent for said nonporous structure while a portion of at least one surface of said nonporous structure is selectively masked to prevent gelation with said solvent thereby to effect gelation of an unmasked portion of said nonporous structure surface to form a gelled portion and evaporating said solvent from said gelled portion to effect precipitation of the gelled portion of said structure to form a patterned porous structure having nondirectional tortuous pathways.

50. The process for forming a porous polymeric structure having a patterned porous surface portion from a nonporous polymeric structure which comprises contacting said nonporous structure with a solvent for said nonporous structure while a portion of at least one surface of said nonporous structure is selectively masked to prevent gelation with said solvent thereby to effect gelation of an unmasked portion of said nonporous structure surface to form a gelled portion and exposing said gelled portion to a humid gaseous composition to effect precipitation of the gelled portion of said structure to form a patterned porous structure having nondirectional tortuous pathways.

51. The process for forming a porous polymeric structure having a patterned porous surface portion from a nonporous polymeric structure which comprises contacting said nonporous structure with a solvent for said nonporous structure while a portion of at least one surface of said nonporous structure is selectively masked to prevent gelation with said solvent thereby to effect gelation of an unmasked portion of said nonporous structure surface to form a gelled portion and changing the temperature of said gelled portion to effect precipitation of the gelled portion of said structure to form a patterned porous structure having nondirectional tortuous pathways.

52. The process of claim 49 wherein two surfaces of said nonporous structure are selectively masked during contact of said nonporous structure with said solvent.

53. The process of claim 50 wherein two surfaces of said nonporous structure are selectively masked during contact of said nonporous structure with said solvent.

54. The process of claim 51 wherein two surfaces of said nonporous structure are selectively masked during contact of said nonporous structure with said solvent.

55. A laminated sheet product comprising a first polymeric sheet and a second polymeric sheet, said first polymeric sheet having a patterned porous surface portion with pores comprising non directional tortuous pathways derived directly by precipitation from a first solid non-porous polymeric structure having a homogeneous polymeric composition and said second polymeric sheet having a patterned porous surface portion with pores comprising non directional tortuous pathways derived directly by precipitation from a second solid non-porous polymeric structure having a homogeneous polymeric composition.

56. The laminated sheet of claim 55 having a substrate sheet interposed between said first polymeric sheet and said second polymeric sheet.

* * * * *